June 24, 1930.   H. S. WALSH ET AL   1,768,531
SAFETY DEVICE FOR PRESSES
Filed Dec. 23, 1926    2 Sheets-Sheet 1
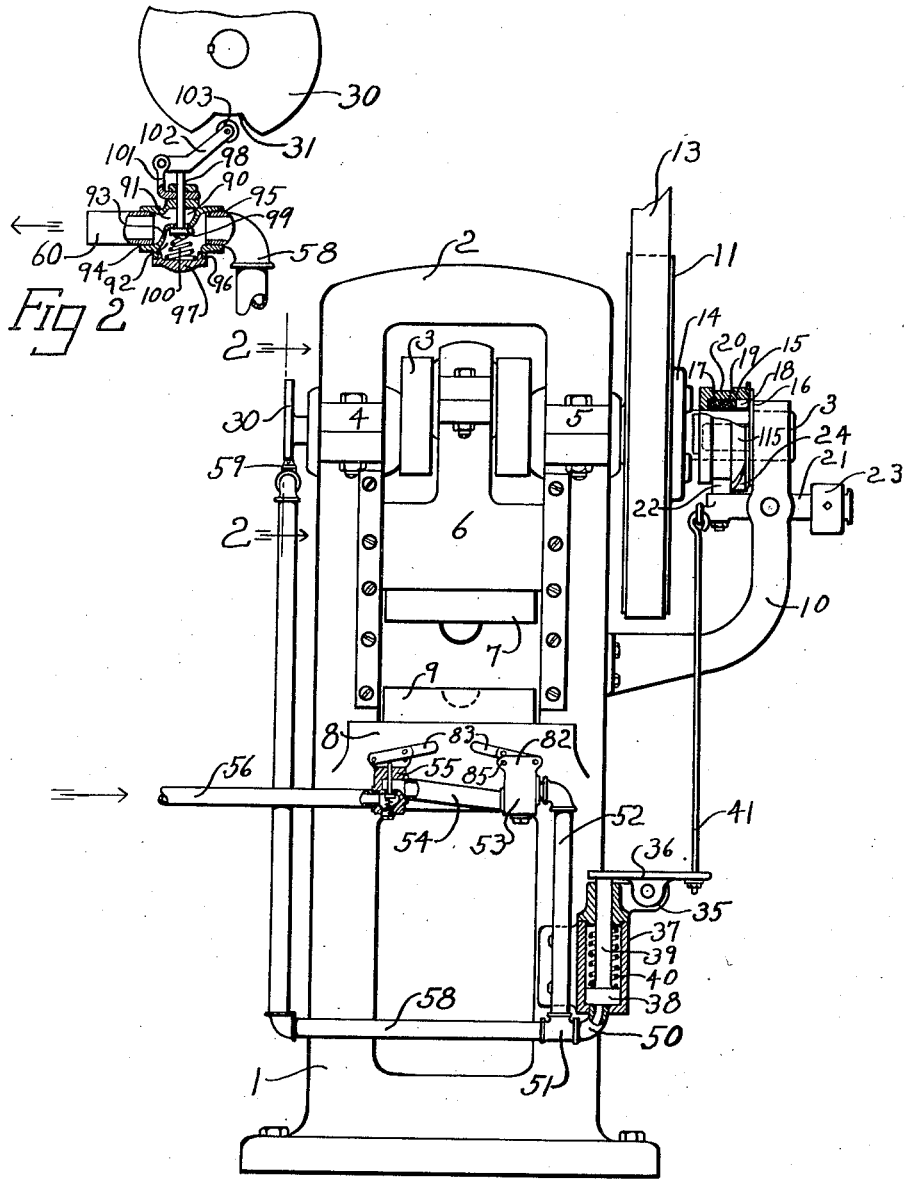
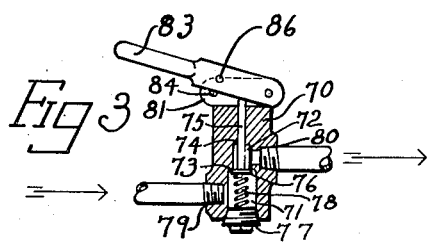
INVENTORS
HARRY S. WALSH AND
MARTIN H. MATHESON.
BY
ATTORNEY

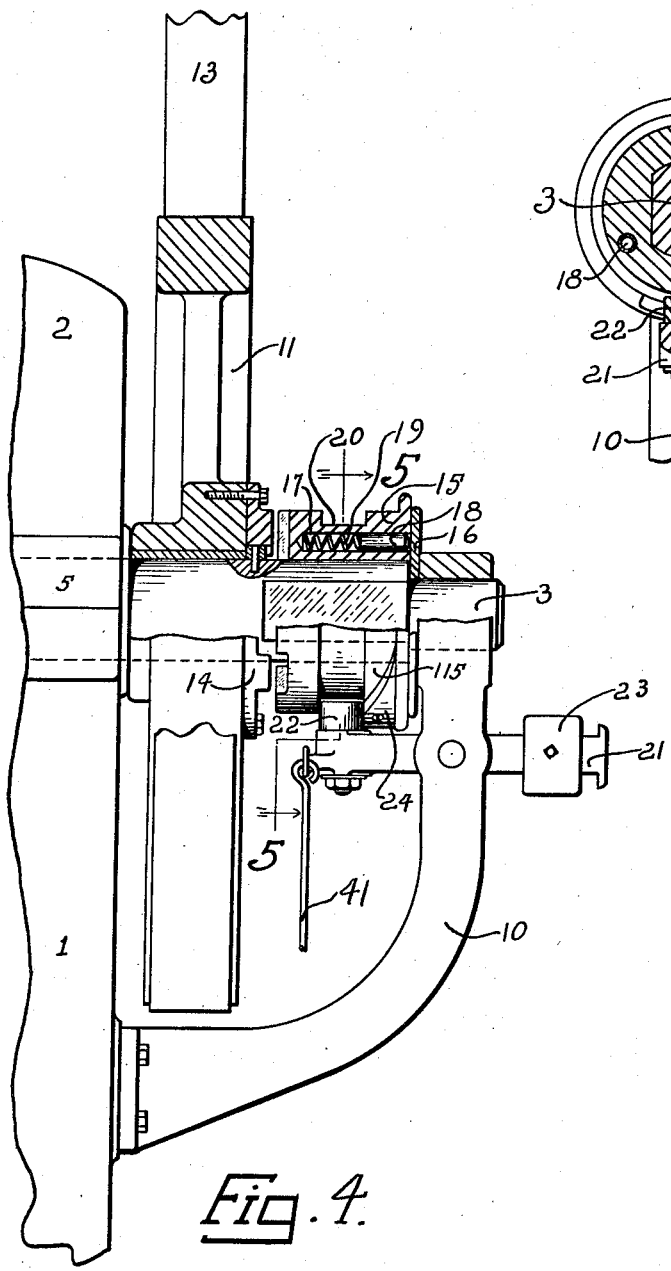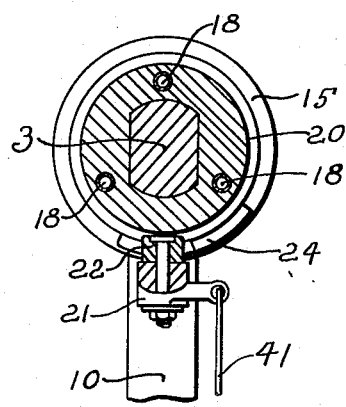

Patented June 24, 1930

1,768,531

UNITED STATES PATENT OFFICE

HARRY S. WALSH AND MARTIN H. MATHESON, OF DETROIT, MICHIGAN, ASSIGNORS TO MURRAY BODY CORPORATION, OF DETROIT, MICHIGAN, A CORPORATION OF MICHIGAN

SAFETY DEVICE FOR PRESSES

Application filed December 23, 1926. Serial No. 156,565.

One of the objects of our invention is to provide means for operating presses which will require the operator or operators to remove their hands and arms from dangerous positions before the press can be tripped.

Another object of our invention is to provide means for operating presses which will require each operator to assume a safe position before the press can be tripped.

Another object is to provide a means for operating presses which permits a more rapid operation than the means now commonly employed.

With these and other objects in view, our invention consists in the arrangement, combination and construction of the various parts of our improved device, as described in the specification, claimed in our claims and shown in the accompanying drawings, in which:

Fig. 1 is a front elevation of a punch press embodying our device.

Fig. 2 is a section taken on line 2—2 of Fig. 1.

Fig. 3 is a detail partly in section of the hand valve embodied in our device.

Fig. 4 is an enlarged view of the clutch mechanism shown in Fig. 1, having parts broken away to better illustrate the construction.

Fig. 5 is a section taken on line 5—5 of Fig. 4.

We have shown a punch press having a frame 1, a crown 2 and a crank shaft 3 journaled in the bearings 4 and 5 formed by the frame 1 and crown 2. Secured to the crank shaft 3 is a slide 6 carrying on its lower end a punch 7. Beneath the slide 6 is a slide cap 8 carrying a die 9. One end of the crank shaft 3 extending beyond the frame 1 is journaled in the end of bearing bracket 10, and mounted thereon adjacent the frame 1 is a belt pulley 11 carrying a drive belt 13 which is connected with power transmitting mechanism (not shown). The belt pulley 11 is so mounted on shaft 3 that it may rotate independently thereof and it has a jaw clutch member 14 secured to the outer face thereof around and adjacent to the shaft 3. Slidably mounted upon shaft 3 and rotatable therewith is a jaw clutch member 15 adapted to engage clutch member 14. Secured to the shaft 3 and bearing against the outer face of clutch member 15 is a plate 16. Positioned in sockets 17 in the clutch member 15 are pins 18 which are pressed outwardly against plate 16 by springs 19 positioned in the inner ends of sockets 17, and which will, when the retaining shoe 22 is pulled out of the groove 20 force clutch member 15 into engagement with clutch member 14. Clutch member 15 has formed in its outer surface a circumferential groove 20. Pivoted on the bearing bracket 10 beneath the end thereof which carries shaft 3 is a clutch retaining member 21 which carries on its inner end a shoe 22 adapted to fit and run in the circumferential groove 20 in clutch member 15. Adjustably secured to the outer end of clutch retaining member 21 is a counter weight 23 for holding shoe 22 normally in engagement with groove 20 in clutch member 15. Secured on the circumference of clutch member 15 adjacent the outer face thereof is a cam 24 adapted at the end of a revolution of clutch member 15 to engage shoe 22 and cause clutch member 15 to slide outwardly on shaft 3 until it becomes disengaged with clutch member 14 and permits shoe 22 to fall into groove 20.

Secured to the end of crank shaft 3 on the opposite side of the machine from bearing arm 10 is a cam wheel 30 having a notch 31 in the circumference thereof. Secured to the lower part of the frame 1 beneath the bearing arm 10 is a treadle bracket 35 in the end of which is pivoted a treadle arm 36. Beneath the treadle bracket 35 and the inner end of the treadle arm 36 is secured a cylinder 37 in which is fitted a piston 38 with its plunger 39 extending upwardly through an opening in the top of the cylinder 37 to contact with the inner end of treadle arm 36. Positioned within the cylinder 37 and around the plunger 39 is a coil spring 40 which bears at one end against the top of the cylinder 37 and at the other against the piston head 38 and which is tensioned to force the piston head 38 downward and against the bottom of the cylinder 37. Secured to the outer end of treadle arm 36 is a pull rod 41 which is also attached at its upper end to the inner end of clutch retaining arm 21.

Leading from the lower end of cylinder 37 is a pipe 50 which is connected by a T coupling 51 to a pipe 52 which leads upward and is connected to an air valve 53, as shown, which is connected by a pipe 54 with a second air valve 55 which in turn is connected with a compressed air tank (not shown) by a pipe 56. Also connected to the pipe 50 by the T coupling 51 is a pipe 58 which leads, as shown, to a point adjacent and directly beneath the cam wheel 30 where it is connected with an air valve 59 from which leads an exhaust pipe 60.

The valves 53 and 55, as shown in Fig. 3, comprise a valve body 70 having a large recess 71 in the lower portion thereof and a smaller recess 72 extending upwardly from said large recess, thus forming shoulders 73 at the inner end of said large recess 71. A passage 74 of sufficient size to accommodate a valve plunger 75 leads from the inner end of recess 72 to the top of valve body 70. A valve head 76 of sufficient size to move freely in recess 71 and to cover the lower end of recess 72 is secured to the lower end of valve plunger 75. The lower end of recess 71 is threaded to receive a screw plug 77. A coil spring 78 is positioned in recess 71 with one end bearing against screw plug 77 and the other end bearing against valve head 76, and is normally tensioned to hold valve head 76 tightly against shoulders 73. An inlet passage 79 is provided for recess 71 and an outlet passage 80 is provided for recess 72. Upon the top of valve body 70 are formed a pair of upwardly extending flanges 81 and 82 which extend along each side of the passage 74 through which extends valve plunger 75. Positioned between the flanges 81 and 82 and pivoted between the ends thereof is a hand lever 83 which bears against the top of valve plunger 75 and which will when depressed force valve head 76 downward in recess 71 and away from shoulders 73, thus opening recess 71 to recess 72. The flanges 81 and 82 are also provided with openings 84 and 85 which will when the hand lever 83 is depressed, align with the opening 86 therein, thus permitting the insertion of a pin through openings 84, 86 and 85 which will hold the lever 83 in a depressed position when desired.

Release valve 59 is constructed, as shown in Fig. 2, and comprises a valve body 90 which is divided into two compartments 91 and 92 by an apertured partition 93. Compartment 91 is provided with an opening 94 in which is fitted exhaust pipe 60, and compartment 92 is provided with an opening 95 in which is fitted the end of pipe 58. Compartment 92 also has a threaded opening 96 in which is fitted a screw plug 97. Extended through the aperture in partition 93 and through a suitable opening in the top of valve body 90 is a valve plunger 98. Secured to the lower end of valve plunger 98 and within compartment 92 is a valve head 99 which is of a size sufficient to cover the aperture in partition 93. Within compartment 92 is positioned a coil spring 100 which bears at one end against screw plug 97 and at the other end against valve head 99 and is tensioned to hold valve head 99 firmly over the opening in partition 93.

Secured to the top of valve body 90 is an upwardly extending bracket 101 in the end of which is pivoted a lever 102 which extends over and bears against the top of valve plunger 98 and terminates at a point within the notch 31 in cam wheel 30. A roller 103 is secured on the free end of lever 102 and is positioned to run on the circumference of cam wheel 30.

In operation, the hand levers 83 are depressed and the valves 53 and 55 are opened which permits a flow of compressed air through the pipes 56, 54, 52 and 50 against the piston head 38, thereby forcing the piston head upward through cylinder 37 and forcing the piston plunger 39 upward against the inner end of treadle arm 36 which causes the pull rod 41 to be drawn downward, pulling the shoe 22 in clutch retaining arm 21 out of the groove 20 in the clutch member 15 thus permitting clutch member 15 to be forced into engagement with clutch member 14 by the action of springs 19 and pins 18 in the clutch member 15. As the shaft 3 carrying the clutch member 15 completes one revolution, the cam 24 strikes the shoe 22 and forces the clutch member 15 outward until the shoe 22 drops into groove 20 and holds the clutch member 15 out of engagement with clutch member 14.

The cam wheel 30 is so positioned that when the clutch member 15 is out of engagement with clutch member 14, the free end of lever 102 and roller 103 on valve 59 rests within the notch 31. When the clutch members 14 and 15 are engaged and the shaft 3 rotates, the cam 30 also rotates causing the engagement of roller 103 with the outer circumference of cam 30, thereby depressing lever 102, forcing valve plunger 98 and valve head 99 downward, and permitting the passage of air from cylinder 37 through pipe 50, pipe 58, compartment 92, partition 93 and compartment 91 of valve 59 to exhaust pipe 60. The opening of valve 59 as described permits spring 40 to force piston 38 downward, thus forcing the air in cylinder 37 out through pipes 50, 58, etc. and also relieving the pull on rod 41, permitting the counter weight 23 to force shoe 22 into engagement with surface 115 of clutch member 15, from which position it is moved by contact with tapered side of cam 24 into groove 20, thus disengaging clutch so that the shaft 3 comes to a complete stop at the end of each revolution, even though the hand levers 83 are kept depressed. If the hand levers are so maintained, however, the stoppage will be only momentary, as the clutch will be again thrown into engagement when the roller 103 reenters notch 31 in the cam wheel 30 and permits the valve 59 to close. A single revolution of the shaft 3 causes the slide 6 to carry the punch 7 down to contact with the die 9 and return to its suspended position.

The air line and hand valves may be disposed about the machine at such points as are convenient for the operator, and when there are several operators additional hand valves may be supplied and connected in the air line so that it will be necessary for each operator to use both hands on the valves in order to trip the press, thus avoiding the possibility of accidents which might be occasioned by untimely tripping.

It is possible when required by operations, to lock any number of the hand valves open by inserting a pin through the openings 84 and 85 in the flanges 81 and 82, and through the opening 86 in the valve handle.

It has been found through experience that the use of the device described not only reduces the number of accidents which usually occur in operating presses without the device, but also materially increases production.

It will be obvious that various changes may be made in the arrangement, combination and construction of the various parts of our improved device without departing from the spirit of our invention, and it is our intention to cover by our claims such changes as may be reasonably included within the scope thereof.

What we claim is:

1. In combination with a press ram, a source of power and clutch means for connecting the same, spring means for moving said clutch means into engagement, means for holding said clutch out of engagement, fluid pressure operated means for releasing said hold out means, manual means for controlling the passage of fluid to said fluid pressure operated means, fluid escape means operable by movement of said ram to relieve the pressure on said fluid pressure operated means, and means cooperating with said hold out means to move said clutch out of engagement at the termination of a complete movement of said ram.

2. In combination with a spring actuated clutch adapted to connect a press ram with a source of power, a movable dog for holding said clutch out of engagement, fluid pressure operated means for releasing said dog, a pair of hand valves for controlling the admission of fluid to said pressure operated means removed from dangerous proximity to said ram and requiring two hands for operation, fluid pressure release means operated by the movement of said ram and permitting the return of said dog to contact with said clutch, and means on said clutch engaging said dog at the completion of the ram movement and withdrawing said clutch from engagement with said source of power.

3. In combination with a press ram, a spring actuated clutch for connecting said ram with a source of power, a movable dog for holding said clutch out of engagement with said source of power, a fluid pressure motor for releasing said dog from said clutch, manual means for controlling the flow of fluid to said motor removed from dangerous proximity to said ram and requiring two hands for operation, means continuously operable by and during movement of said ram for relieving fluid pressure from said motor, and a cam member on said clutch engaging said dog at the completion of the ram movement and withdrawing said clutch from engagement with said source of power.

MARTIN H. MATHESON.
HARRY S. WALSH.